United States Patent
Niculescu

(10) Patent No.: US 6,367,352 B1
(45) Date of Patent: Apr. 9, 2002

(54) CRANKSET WITHOUT DEAD CENTER POINT, AND ASSEMBLY COMPRISING SUCH A CRANKSET AND A MEASURING APPLIANCE

(75) Inventor: Florin Niculescu, Bevaix (CH)

(73) Assignee: Roland Bitz, Saint-Loenard (CH)

( * ) Notice: Subject to any disclaimer, the term of this patent is extended or adjusted under 35 U.S.C. 154(b) by 0 days.

(21) Appl. No.: 09/581,079

(22) PCT Filed: Dec. 9, 1998

(86) PCT No.: PCT/CH98/00530

§ 371 Date: Jun. 9, 2000

§ 102(e) Date: Jun. 9, 2000

(87) PCT Pub. No.: WO99/29564

PCT Pub. Date: Jun. 17, 1999

(30) Foreign Application Priority Data

Dec. 9, 1997 (EP) .............................. 97121644

(51) Int. Cl.[7] .......................... G05G 1/14; F16G 59/00; F16G 63/00
(52) U.S. Cl. ........................ 74/594.1; 474/69; 74/594.2
(58) Field of Search .......................... 474/69, 164, 160; 74/594.1, 594.2, 594.3, 594.4; 280/259, 260, 261

(56) References Cited

U.S. PATENT DOCUMENTS

| | | | |
|---|---|---|---|
| 4,300,411 A | * 11/1981 | Segawa | ...................... 74/594.2 |
| 4,816,009 A | 3/1989 | Philipp | |
| 5,062,318 A | * 11/1991 | Yamazaki | ............... 74/594.1 X |
| 5,067,370 A | 11/1991 | Lemmens | ................... 74/594.2 |
| 5,809,844 A | * 9/1998 | Durham | .................. 74/594.2 X |
| 5,816,599 A | * 10/1998 | Soejima et al. | ............. 280/259 |
| 5,852,954 A | * 12/1998 | Yamanaka | ............. 74/594.2 X |
| 6,116,114 A | * 9/2000 | Edwards | ..................... 74/594.1 |
| 6,161,452 A | * 12/2000 | Hilber | ........................ 74/594.1 |

FOREIGN PATENT DOCUMENTS

| | | |
|---|---|---|
| FR | 2520692 | 8/1983 |
| FR | 2584671 | 1/1987 |
| WO | 86 05459 | 9/1986 |
| WO | 97 20726 | 6/1997 |

* cited by examiner

Primary Examiner—Thomas R. Hannon
Assistant Examiner—Marcus Charles
(74) Attorney, Agent, or Firm—Sughrue Mion, PLLC

(57) ABSTRACT

The crankset with no dead center position includes a single crankshaft (108), fitted with a left crank (11) and a support hub (119) provided with a lever (20). This hub is mounted by a roller bearing (28) in a stationary eccentric member (26) which supports a rotatable chain wheel carrier (15). The hub also supports the right crank (13) via pre-stressed bearings (62, 63). The lever (20) and said crank (13) drive the chain wheel carrier by means of two articulated connecting rods (21 and 23). An indexing ring (30) is provided on the fixed crankset tube (2) to prevent the eccentric member (26) from rotating. These means can include a force sensor allowing a measuring device to calculate the energy and the power transmitted through the crankset. Such a crankset can be used for driving bicycles and other muscle-powered vehicles or machines.

20 Claims, 12 Drawing Sheets

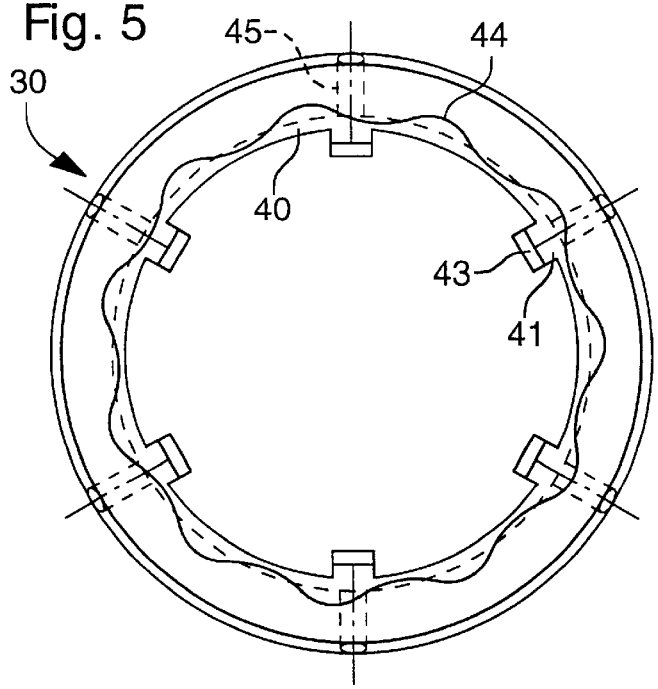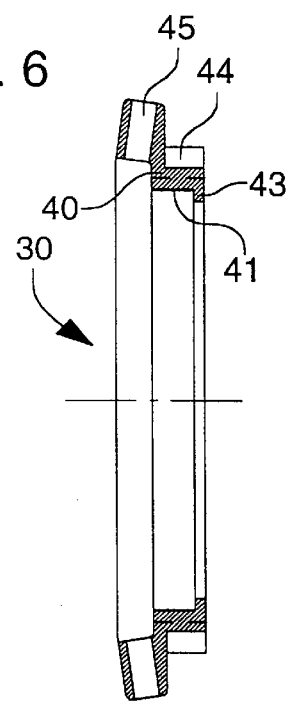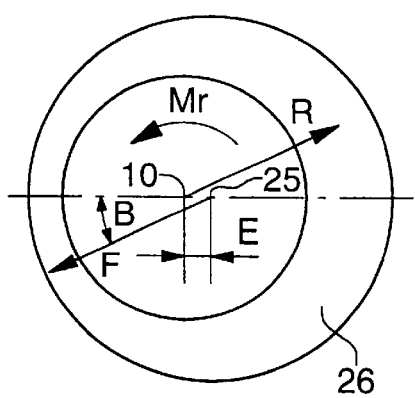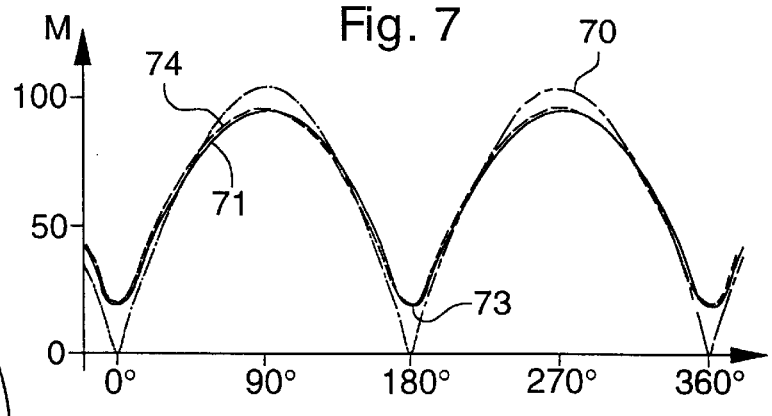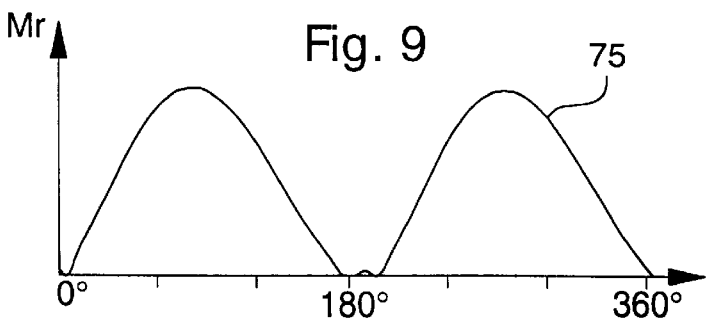

Figure 1:
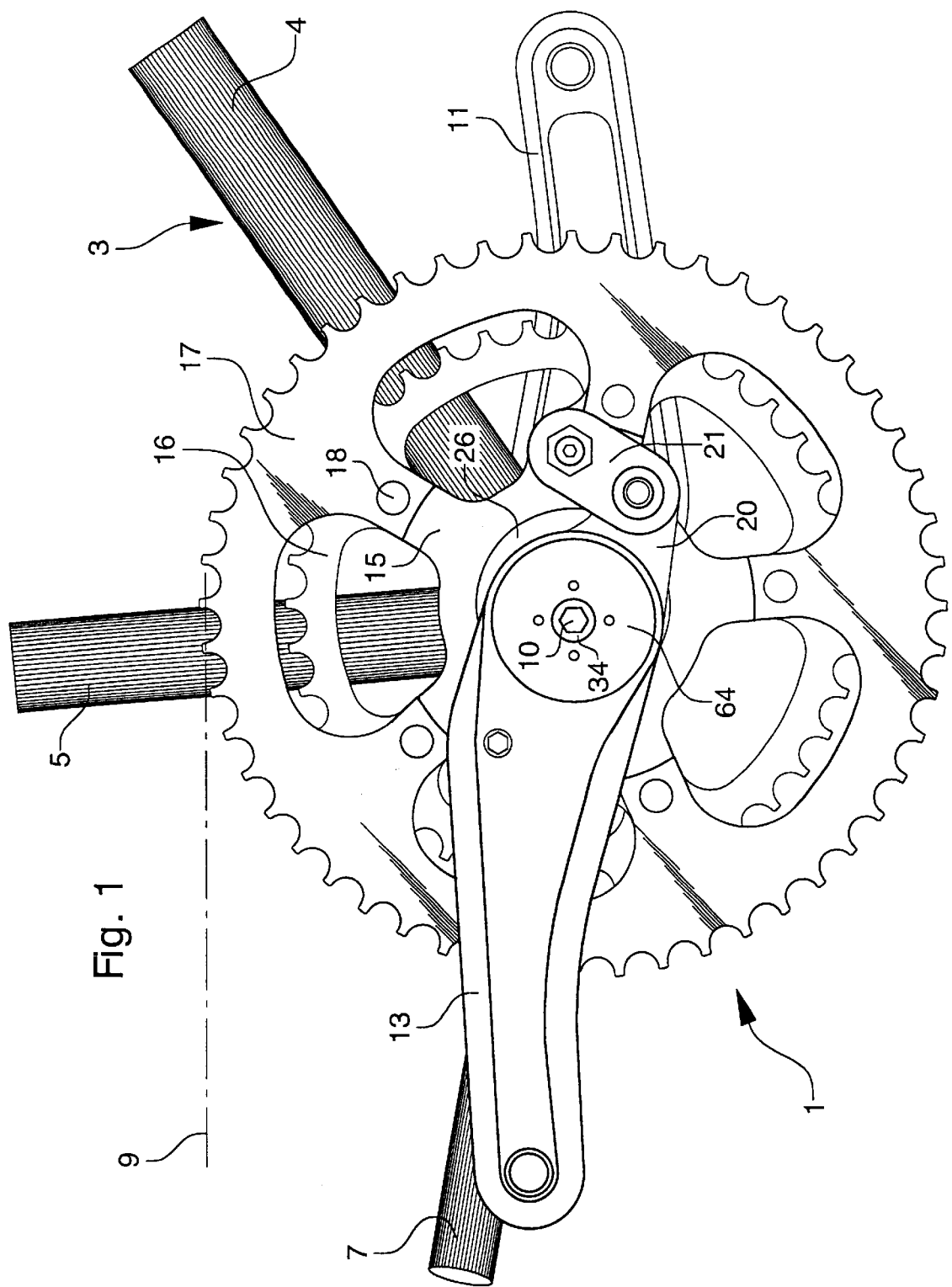

CRANKSET WITHOUT DEAD CENTER POINT, AND ASSEMBLY COMPRISING SUCH A CRANKSET AND A MEASURING APPLIANCE

BACKGROUND OF THE INVENTION

The present invention concerns a crankset with no dead center position, in particular for a bicycle, including:
  a fixed crankset tube,
  a crankshaft rotatably mounted about a central axis within the crankset tube,
  a first crank fixed to a first end of the crankshaft,
  a second crank having a base rotatably mounted with respect to a second end of the crankshaft,
  an eccentric member arranged in proximity to the second end of the crankshaft and connected to the tube via stopping means,
  an output member mounted on the eccentric member so as to rotate about an eccentric axis which is parallel to the central axis, but offset in a direction of eccentricity, the output member being arranged to drive a mechanical transmission, and
  a first and a second articulated linkage respectively connecting the crankshaft and the second crank to the output member to drive the latter.

SUMMARY OF THE INVENTION

The invention further concerns an assembly including such a crankset and an apparatus for measuring the power transmitted by the crankset.

The invention applies in particular to bicycle cranksets, but also to any other case of use of a muscle-powered crankset, for example to propel any vehicle or to power a machine, a ventilator, an electric generator, etc. Usually, the output member is provided with one or more chain wheels of a chain transmission.

In a conventional crankset, the two vertical positions of the cranks in a same radial plane constitute dead center positions, because the weight of the person pedaling cannot generate torque on the crankset in these positions. In order to overcome this drawback, it has been proposed for a long time to create a cyclical angular displacement between the cranks when they are in the top and bottom positions, as a result of bringing the chain wheels forwards in an off-center position. International Patent Application WO 97/20726 discloses such a crankset having two concentric crankshafts, whereas French Patent Nos. 763 303 and 984 583 and U.S. Pat. No. 5 067 370 disclose cranksets of this type having a single crankshaft, as in the present invention. Despite their kinematic and dynamic advantages, these cranksets have not made much impact on the market.

In the state of the art, cranksets with no dead center position and a single crankshaft have two main problems which have not been resolved in a satisfactory manner to date: sufficiently rigid and durable rotating assembly of the second crank, generally situated to the right, and a way of supporting the eccentric member which allows it to be connected to the tube in a manner which is both rigid and simple, modifying as little as possible the usual bicycle frame design.

For example, in the crankset disclosed in U.S. Pat. No. 5 067 370, the eccentric member is pivotably mounted, so that the direction of eccentricity is adjustable, on an externally threaded socket which is screwed into the crankset tube (called bottom bracket) in place of the usual socket and which thus extends the tube. The crankshaft overhangs inside this socket and beyond, to support the lever of the first articulated linkage, and further on the second crank which pivots on a nut screwed onto the crankshaft. The construction proposed in this document manifestly lacks rigidity, in particular because of the excessive overhang of the crankshaft. Such a construction requires the length and diameter of the crankshaft to be increased and cannot thus use usual components. Moreover, the mounting and dismantling of the crankset, operations which are required by current maintenance or the replacement of certain parts, appear quite complicated.

The present invention concerns a crankset capable of avoiding the aforementioned drawbacks, in particular so as to provide a high level of rigidity and to allow certain standard conventional crankset parts to be used, in particular the crankshaft and the elements which support the latter in the crankset tube.

Another particular object consists in arranging the crankset mechanism in a removable sub-assembly which can easily be mounted in place of the corresponding mechanism of a conventional crankset.

Another particular object is to allow easy adjustment of the direction of eccentricity of the crankset.

A further particular object consists in incorporating in the crankset a device for measuring the driving torque generated by the person pedaling.

According to a first aspect, the invention concerns a crankset of the type indicated in the preamble, characterized in that the second end of the crankshaft is provided with support hub on which the eccentric member and the second crank are rotatably mounted by respective bearings, the support hub being provided with a lever forming part of the first articulated linkage.

As a result, the second crank arm, the output member and the entire mechanism which assures the elimination of dead center positions are supported by the hub and can be mounted in advance on the latter in the form of a sub-assembly. Moreover, the hub can be dimensioned so as to have a desired rigidity. It may either be made integral with the crankshaft, or formed of a distinct part, for example arranged to be fitted in place of an ordinary crank on the end of a crankshaft available on the market.

A considerable advantage is that the bearings carried by the hub, especially those of the second crank, can have an inner diameter which is markedly larger than the outer diameter of the crankshaft, and can thus assure a high level of rigidity, bear non-radial loads without damage and have a long service life.

In a particularly advantageous embodiment of a crankset according to the invention, the crankset includes a device for measuring the reaction torque exerted on the eccentric member by the stopping means. This device can include a single sensor, in the form of a force sensor incorporated in the stopping means, i.e. the means preventing the rotation of the eccentric member.

According to another aspect of the present invention, there is provided an assembly including such a crankset, provided with a reaction torque measuring device, and an apparatus for measuring the energy transmitted by the crankset, said apparatus including the device for measuring the reaction torque exerted on the eccentric member by the stopping means. This device can include only one sensor, i.e. a force sensor, incorporated in the stopping means. This sensor has the great advantage of being stationary and can thus easily transmit its output signal to the measuring device mounted, for example, on the bicycle frame or handlebars. The measuring apparatus can include means for calculating and displaying a power on the basis of the measured energy.

Figure 2:
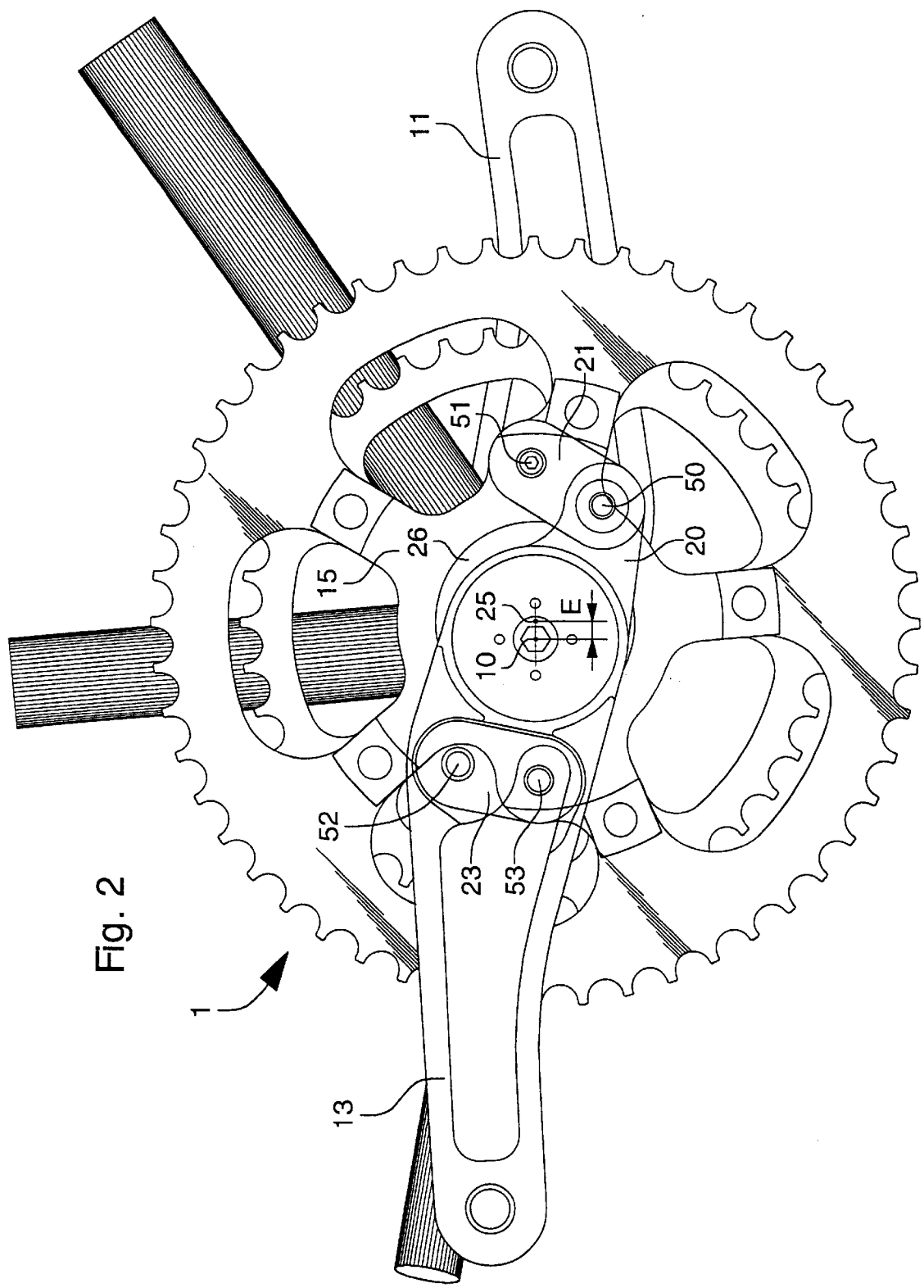
Figure 3:
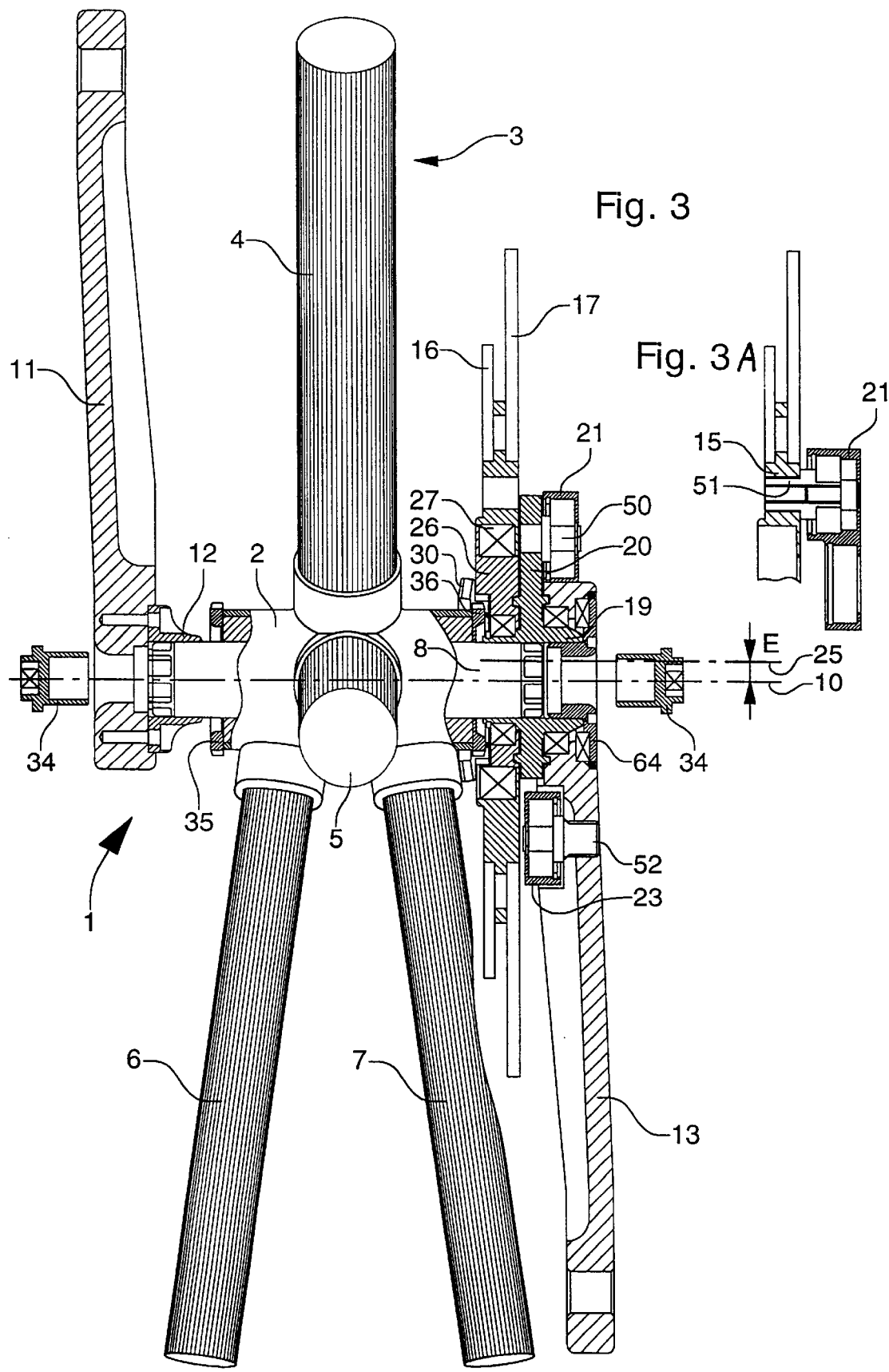

Other features and advantages will appear in the following description of various preferred embodiments of a bicycle crankset according to the invention, given by way of example with reference to the annexed drawings, in which:

FIG. 1 is a lateral elevation view of a first embodiment of a crankset with no dead center position according to the invention, FIG. 2 is a similar view to FIG. 1, also showing hidden elements of the crankset, FIG. 3 is a cross-section of the crankset of FIG. 1 in the plane of its two parallel axes, this plane being for example horizontal, FIG. 3A is a detail of a portion of FIG. 3 to show the articulation of the connecting rod 21 on the chain wheel carrier 15.

Figure 4:
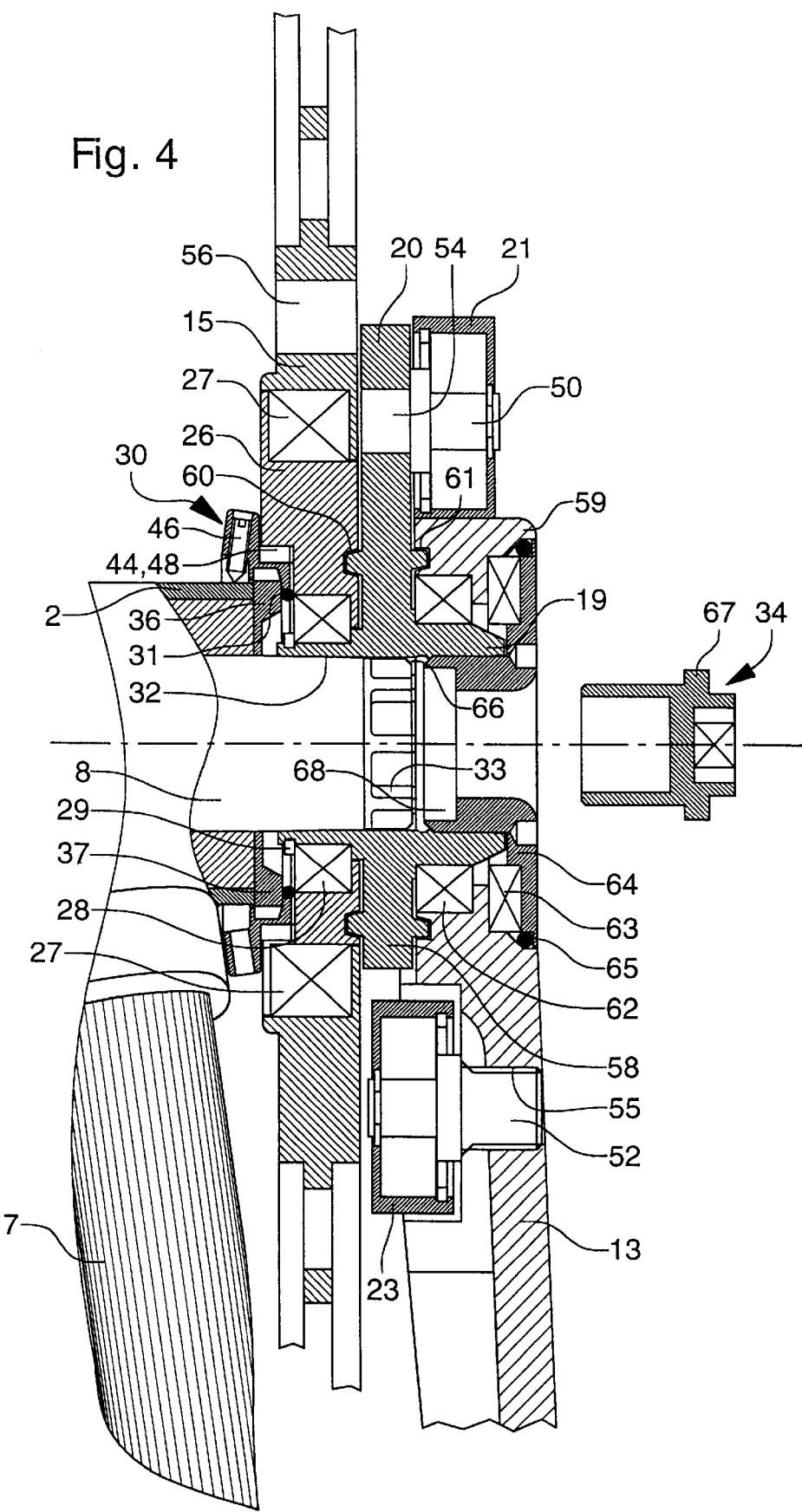
Figure 10:
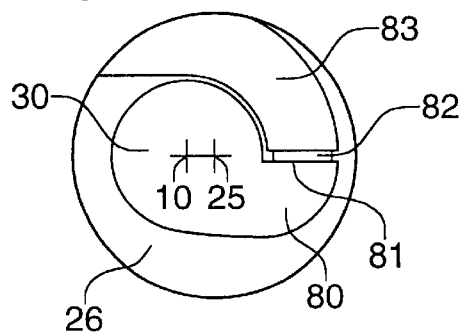
Figure 11:
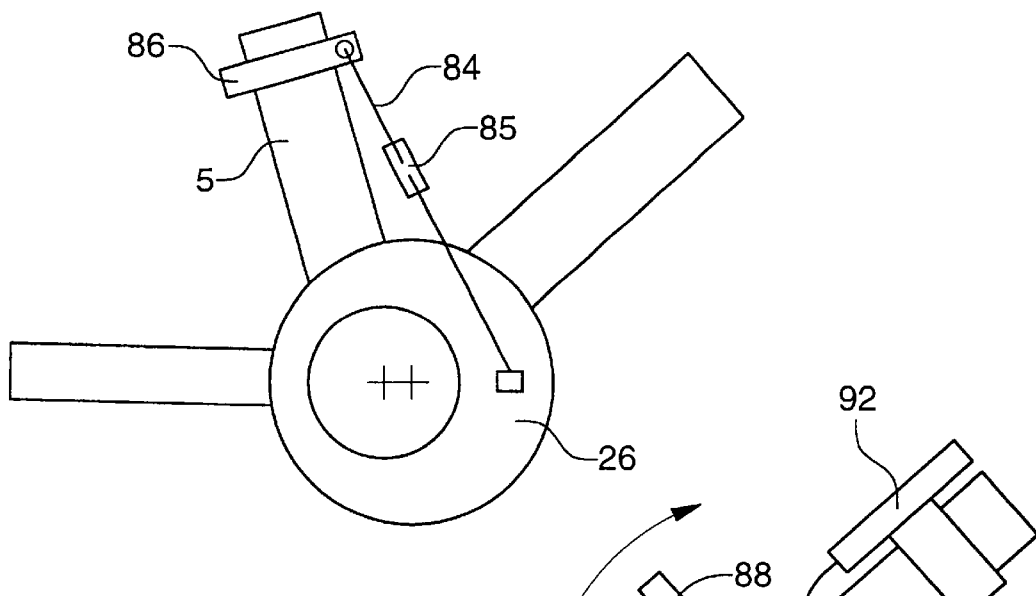
Figure 12:
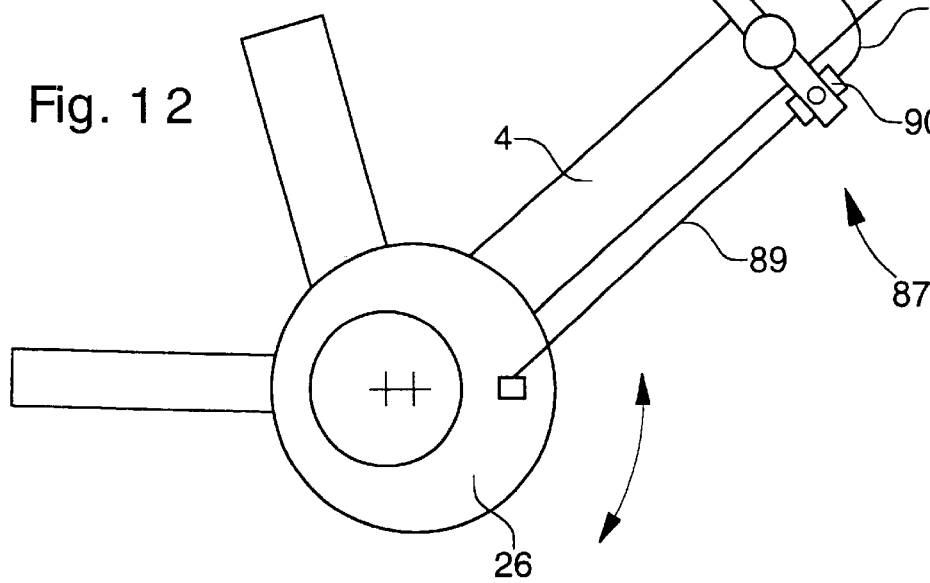
Figure 15:
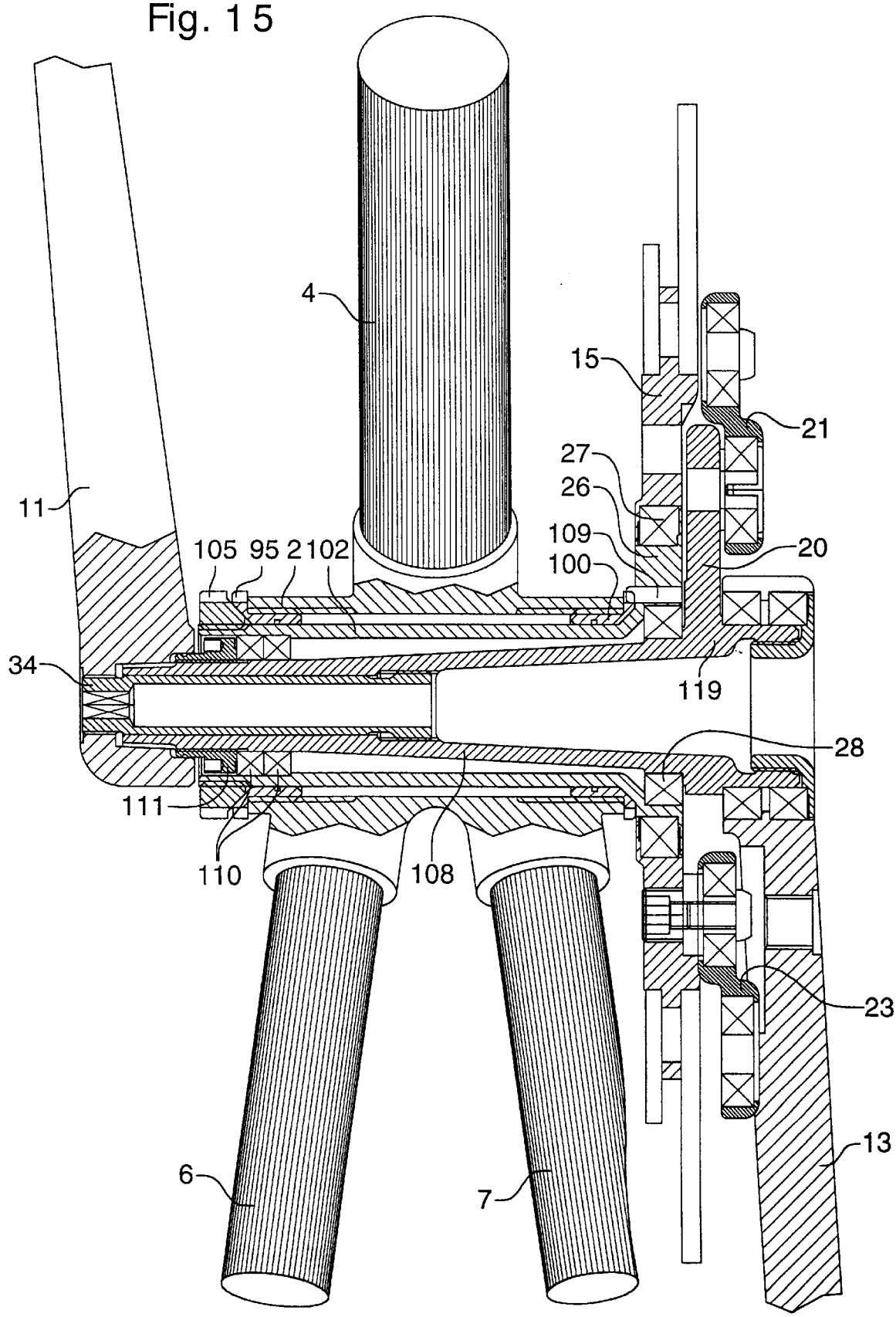
Figure 16:
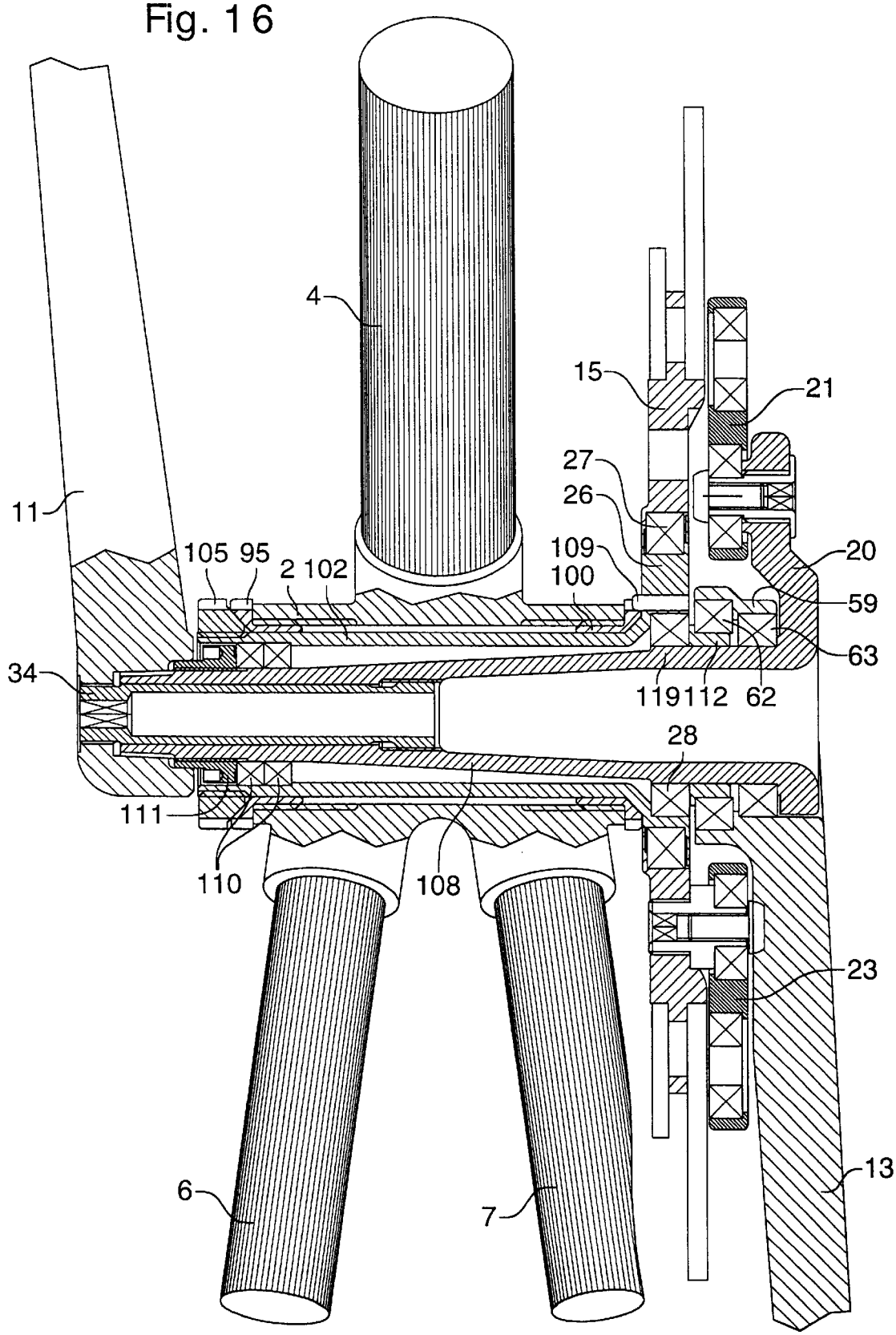
Figure 17:
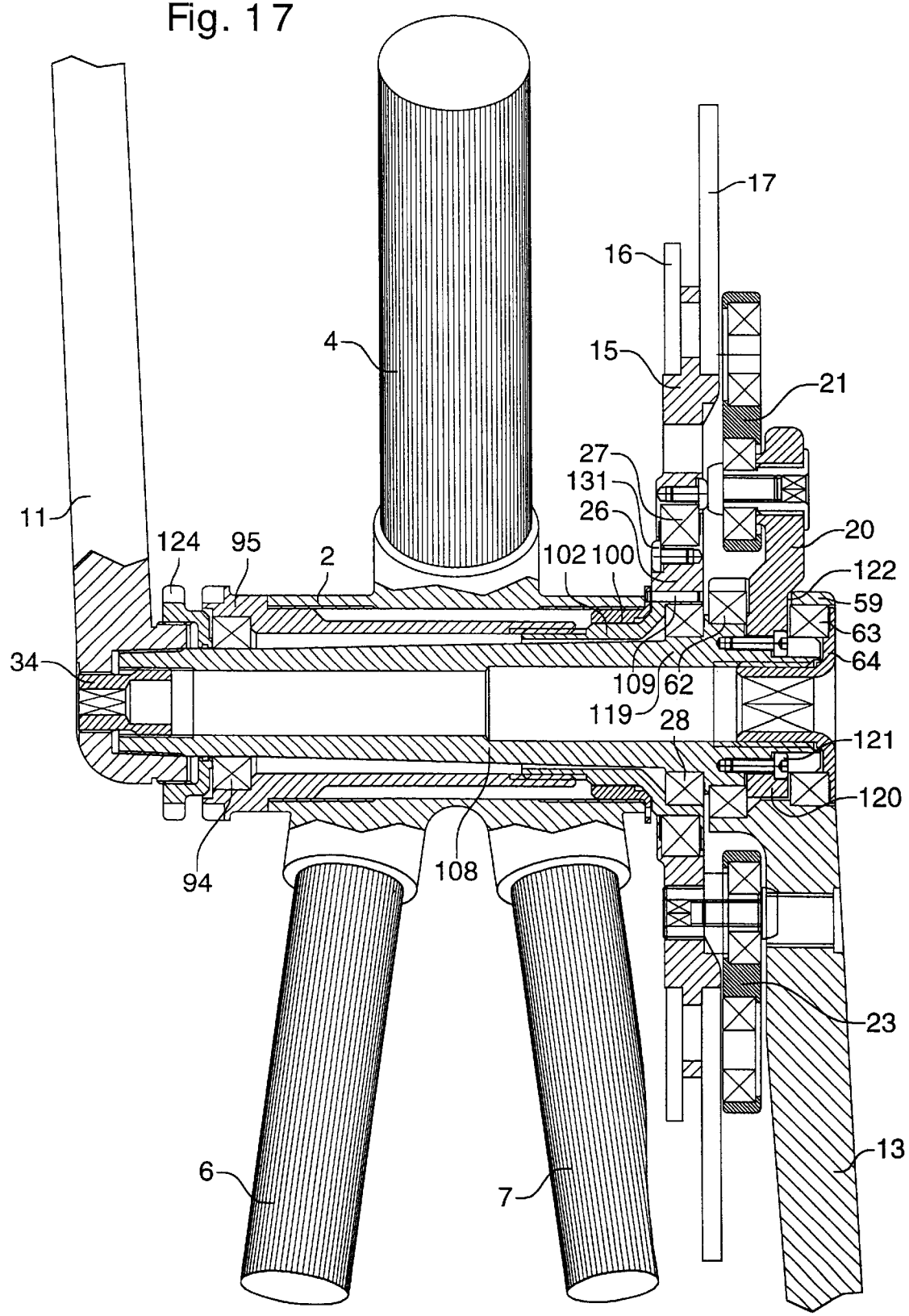
Figure 18:
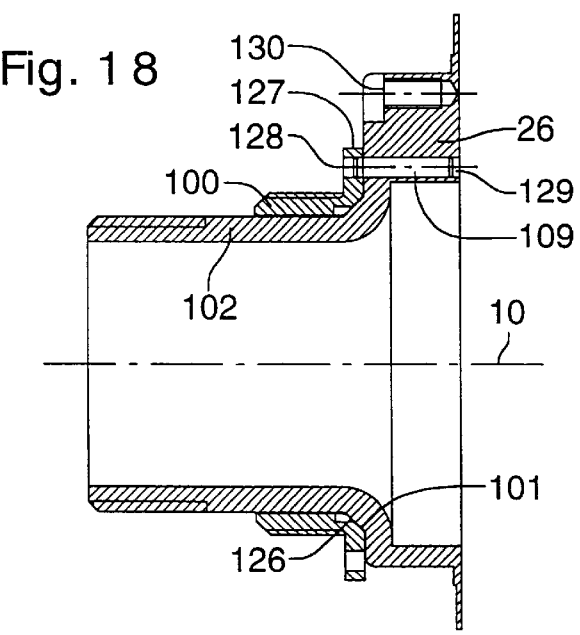
Figure 19:
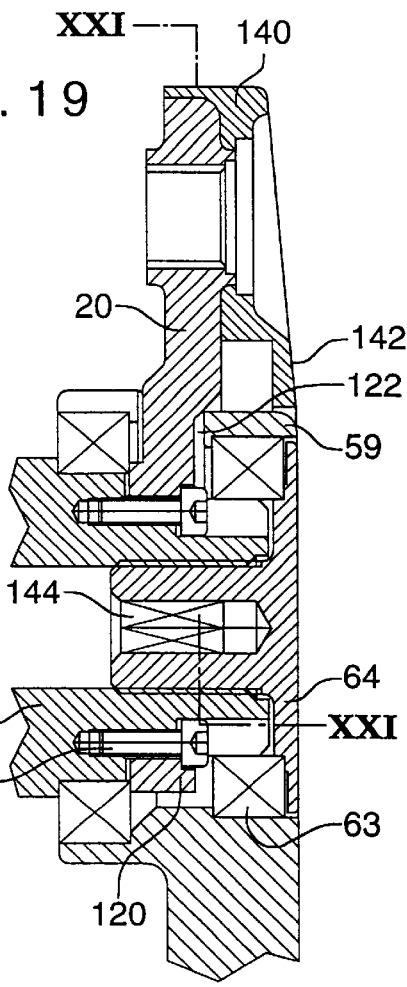
Figure 21:
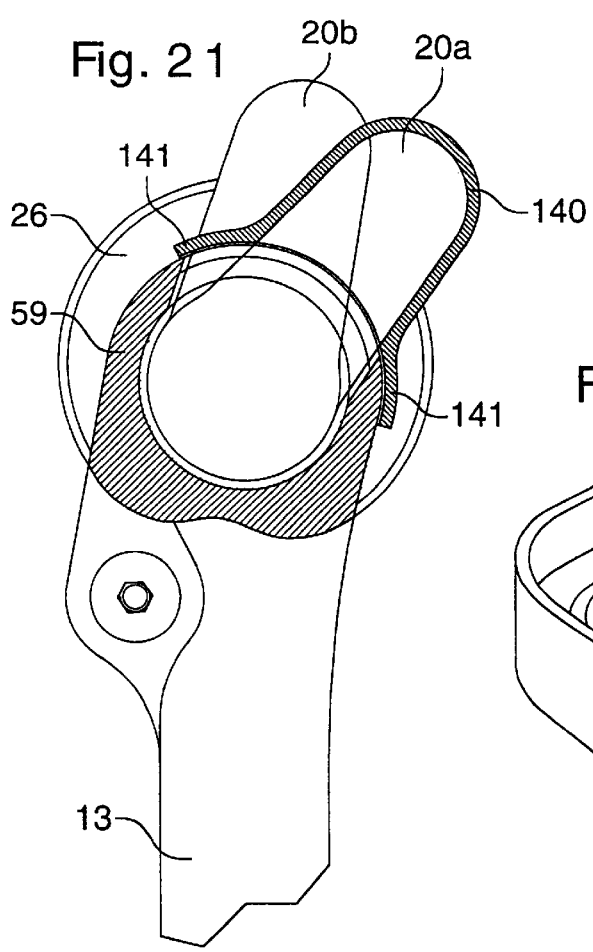
Figure 20:
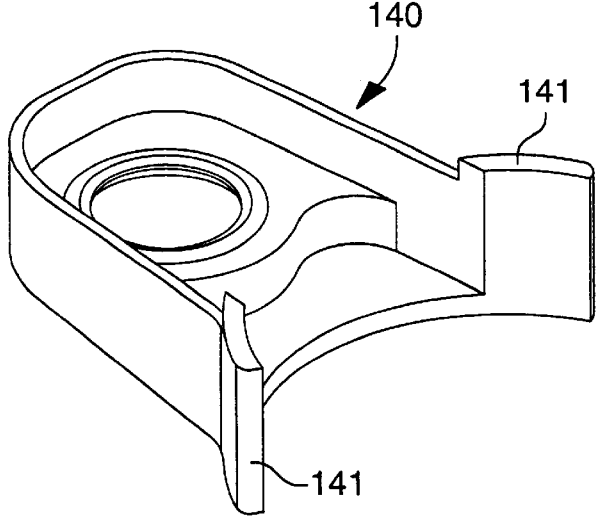

FIG. 4 is an enlarged cross-section of a portion of FIG. 3,

FIGS. 5 and 6 show an indexing ring, respectively in lateral elevation and in radial cross-section, FIG. 7 shows the evolution in the torque transmitted to the chain wheels over one revolution of the crankset, when the cyclist exerts solely a downward vertical force on the pedals, FIG. 8 shows schematically the stress exerted on the eccentric member, FIG. 9 shows the evolution in the reaction torque exerted on the eccentric member over one revolution of the crankset, FIGS. 10 to 12 show schematically different possible arrangements of a force sensor associated with the eccentric member, FIGS. 13 to 17 are similar cross-sections to FIG. 3, each showing another embodiment of the crankset, FIG. 18 is an enlarged cross-section showing a detail of FIG. 17, FIG. 19 is an enlarged cross-section showing a protective cap which can be used in the crankset of FIG. 17, FIG. 20 shows in perspective the cap of FIG. 19, and FIG. 21 is a simplified cross-section along the line XXI—XXI of FIG. 19.

DETAILED DESCRIPTION OF THE INVENTION

Referring to FIGS. 1 to 3 and 3A, the crankset 1 includes a crankset tube 2 which is incorporated in a bicycle frame 3, this frame including tubes 4, 5, 6 and 7 each having one end welded to tube 2. A conventional hollow crankshaft 8 is rotatably and coaxially mounted in tube 2 so as to rotate about a central axis 10. A left crank 11 provided with a pedal which is not shown, is fixed in a known manner onto a first end of crankshaft 8 by means of a sleeve 12 and a plug 34 screwed into the crankshaft. A right crank 13 provided with a pedal which is not shown, is rotatably mounted relative to the second end of crankshaft 8. On the right side of the bicycle, crankset 1 includes a chain wheel carrier 15 on which, in a conventional manner, are mounted for example two removable toothed chain wheels 16 and 17 for driving the back wheel of the bicycle via a chain transmission 9. The chain wheels are fixed by means of screws 8.

In a radial plane situated between chain wheel carrier 15 and right crank 13, a support hub 19 fixed to crankshaft 8 has a radial lever 20 whose free end is connected to the chain wheel carrier by an articulated connecting rod 21. Likewise, the right crank is connected to the chain wheel carrier by an articulated connecting rod 23 identical to connecting rod 21. Lever 20 and right crank 13 extend in approximately opposite respective directions, but oscillate angularly with respect to each other over the revolution of the crankset, as do the cranks with respect to each other.

In FIGS. 2 to 4, it will be noted that chain wheel carrier 15 is eccentrically mounted relative to crankshaft 8, its center of rotation being situated on an eccentric axis 25 parallel to central axis 10, but off-centered forwards by an eccentricity E relative to the latter. Chain wheel carrier 15 is mounted on the periphery of a stationary eccentric member 26 by means of a ball bearing 27. Eccentric member 26 is a generally disc-shaped part including a circular opening centered on axis 10, for accommodating a ball bearing 28 fixed via a circlip 29 onto hub 19. The eccentric member is therefore supported and centered by the hub, and thus also by crankshaft 8 which carries the latter. Moreover, the eccentric member is connected to bicycle frame 3, in particular to crankset tube 2, by stopping means which prevent it from rotating about axis 10. In the present example, these means include an indexing ring and a compressible ring 31.

Conventional crankshaft 8 used in this example is marketed by Shimano under the reference Dura-Ace BB-7700. Each of its ends has a slightly conical portion 32, intended to be used as a seating for a crank or for sleeve 12, and hub 19, and a head with a grooved profile 33 for blocking any rotation of such a crank on the crankshaft. A threaded plug 34 for axially fixing the crank or the sleeve is screwed into the end of crankshaft 8. This crankshaft is mounted in tube 2 in a conventional manner by means of roller bearings which are not shown and two sockets 35 and 36 provided with sealing members and an external flange 37 having six notches regularly spaced on its periphery for the engaging of a socket wrench. Each socket is screwed inside the tube until its flange 37 is blocked against the end of the tube.

Referring to FIGS. 5 and 6, it will be noted that indexing ring 30 includes an annular body 40 having six inner lugs 41 arranged for engaging in the notches of socket 36 shown in FIG. 4. Each lug 41 also includes an inner rim 43 intended to abut against this socket. On the outside, body 40 has a prime number of regularly spaced grooves 44, eleven in the present case, so that they all have a different angular displacement relative to the closest lug 41. Six approximately radial threaded holes 45 are arranged in body 40 for blocking screws 46 (FIG. 4) used to hold ring axially on tube 2.

Referring to FIG. 4, it will be noted that eccentric member 26 also includes eleven rippled grooves 48 arranged for engaging on grooves 44 of indexing ring 30 in order to prevent any rotation of the eccentric member relative to the ring. Ring 31, preferably made of a compressible material, is inserted between eccentric member 26 and socket 36 along rims 43 of ring 30. This ring fulfills two functions. On the one hand, it constitutes a sealing gasket between elements 26 and 36. On the other hand, it assures an elastic axial support which opposes any declining movement of the eccentric member and the chain wheel carrier if crankshaft 8 tends to bend under significant stress. This support thus relieves the crankshaft and the bearings which support the latter.

During mounting of the crankset, indexing ring 30 can be placed in six different positions on socket 36, then eccentric member 26 can be engaged on the ring in eleven different positions to be selected by the user. Thus, it is possible to mount eccentric member 26 on indexing ring 30 so as to orient eccentricity E in any desired direction. This direction is horizontal and forwards in the example shown. In a known manner, it follows that when one of cranks 11, 13 is in the vertical plane passing through axis 10, the other crank is forwards of such plane and generates torque when the person pedaling presses vertically thereon, as will be explained with reference to FIG. 7.

In FIG. 3, connecting rods 21 and 23 are shown in a fictional radial position, in order to clarify the drawing and to allow the construction of their articulations to be seen. This is why the articulation of connecting rod 21 on chain wheel carrier 15 has been shown separately in FIG. 3A. An articulated linkage of this type is described in detail in International Patent Application WO 97/20726 of the present inventor, to which the reader can refer if necessary. With reference to FIGS. 2 and 4, it will be noted simply that the articulations of connecting rods 21 and 23 on crank 13 are achieved by sealed roller bearings mounted on shafts 50, 51, 52 and 53 which are fixed respectively in an orifice 54 of lever 20, an orifice 55 of crank 13 and two orifices 56 of chain wheel carrier 15 which are diametrically opposite relative to eccentric axis 25.

Support hub 19 includes an external radial flange 58 situated between eccentric member 26 and base 59 of right crank 13. On the two faces of flange 58 and on the corresponding faces of eccentric member 26 and base 59 of the crank, sinuous complementary profiles are arranged to form labyrinth sealing gaskets 60 and 61 between such parts, in order to protect the bearings from water spray and dirt. Preferably, hub 19, flange 58 and lever 20 are made in a single part, but they may be made in several parts.

A roller bearing 62 is mounted about the outer portion of hub 19 for supporting base 59 of the right crank. Its inner ring abuts axially against flange 58. Bearing 62 is pre-stressed axially by means of an axial thrust bearing 63 arranged between base 59 and an annular cover 64 which is screwed into the inside of hub 19. A sealing gasket 65 placed between the periphery of cover 64 and base 59 protects bearings 62 and 63 as regards the exterior.

The mounting of crank 13 on hub 19 by means of bearings 62 and 63 which are relatively large and pre-stressed allows significant stress to be borne without any play and guarantees a long service life. Moreover, this assembly does not need to be dismantled when one wishes to remove the crankset from the bicycle.

The interior of hub 19 has a grooved projecting profile 66 which engages axially on grooved head 33 of crankshaft 8 and which is pushed axially by an external flange 67 of threaded plug 34 when the latter is screwed into crankshaft 8. Thus, hub 19 fitted onto the end of the crankshaft is prevented from rotating on it by grooved elements 33 and 66. It will be noted in FIG. 4 that plug 34 is shown on the exterior in order to clarify the drawing, but in reality, its flange 67 is housed in an annular recess 68 of cover 64. Thus, when plug 34 is unscrewed, it pushes cover 64 outwards and thus pulls out hub 19 which is secured on conical portion 32 of crankshaft 8. All the elements mounted on hub 19 remain thereon, eccentric member 26 being released from grooves 44 of indexing ring 30. The entire right portion of the crankset is thus withdrawn in a single block, comprising the support hub, the eccentric member, the chain wheels, the right crank and the entire mechanism for eliminating any dead center positions.

Moreover, the construction described hereinbefore allows the crankset to be assembled in advance, outside tube 2, then to be mounted in one block onto crankshaft 8, or to be replaced by an ordinary crank fitted with a chain wheel carrier.

FIG. 7 shows the output torque M applied to chain wheel carrier 15 as a function of the angle of rotation of the latter, assuming that the cyclist exerts only a downward vertical force on the descending crank. Curve 70 shows the torque in a conventional crankset wherein both cranks are fixed to the chain wheel. Curve 71 shows the torque in crankset 1 according to the invention, in the position of FIG. 2, i.e. with horizontal eccentricity E forwards.

Curve 71 is flatter than curve 70, i.e. the torque is more uniform over one revolution of the crankset. The minimum torque 73, in the dead center position zone where the conventional crankset torque drops to zero, represents approximately 20% of the maximum torque. In practice, it is known that the minimum torque will often be a little higher, because an experienced cyclist nonetheless applies certain horizontal or ascending forces to the pedals.

Curve 74 shows the torque in crankset 1 when eccentricity E is directed forwards at 30° below the horizontal. It will be noted that it is very close to curve 71 and has the same minimum and maximum values, i.e. such pivoting of eccentric member 26 does not affect the crankset performance when the forces applied to the pedals are vertical. Conversely, it allows the crankset kinematics to be adapted, in particular the position of the zone in which the cranks are offset, to the morphology of the cyclist and his position on the bicycle.

FIG. 8 shows schematically the stress acting on eccentric member 26 in its own plane, if friction is ignored. By the effect of the tension of the chain and the stress transmitted by the connecting rods, chain wheel carrier 15 exerts a force F on the eccentric member passing through the center of bearing 27, represented by axis 25. This force F is inclined at an angle B relative to the direction of eccentricity E, which is assumed to be horizontal in the present case. Since eccentric member 26 is rotatably mounted relative to axis 10, force F is balanced by a reaction force R opposite to F, but passing through axis 10, and by a reaction torque Mr generated by the stopping means, i.e. grooves 44 of the indexing rings in the example described hereinbefore. Since Mr=−F·E·Sin B and the value of E is always relatively low, typically around 5 to 10 mm, the value of torque Mr always remains quite low.

FIG. 9 shows schematically the evolution in reaction torque Mr as a function of the angle of rotation of the chain wheel carrier. It will be noted that torque Mr always has the same sign and its curve 75 has two minimum positions and two maximums close to zero over each revolution.

These observations led to the inventive idea consisting in continuously measuring reactive torque Mr and integrating it as a function of the rotation of the chain wheel carrier to obtain a value representative of the energy transmitted by the user via the pedal. By dividing this energy by the time period being considered, one can calculate the mean power provided by the user during this time period.

One great practical advantage of this method is that reaction torque Mr can be measured by means of a single stationary sensor, which is not possible in practice with a conventional crankset. The sensor is preferably a force sensor mounted on the bicycle frame and associated with stopping means which prevent a rotation of the eccentric member. FIGS. 10 to 12 give several arrangement examples of such a force sensor.

According to FIG. 10, instead of grooves 48 described hereinbefore, indexing ring 30 includes a lateral projecting portion 80 having a radial surface 81 which carries a force sensor 82. Eccentric member 26 rests on this sensor via a corresponding lateral projecting portion 83.

In the alternative of FIG. 11, eccentric member 26 rests on tube 5 of the bicycle frame by means of a cable 84 associated with a sensor 85 which measures the cable tension. The cable is fixed to tube 5 by means of a ring 86 which can be moved to adjust the direction of eccentricity.

In the alternative of FIG. 12, the user can adjust the direction of eccentricity of eccentric member 26 during use by means of a control mechanism 87 including an operating lever 88 mounted on tube 3 of the frame and connected to the eccentric member by a cable 89 or a rod. Sensor 90 measuring the tension of this cable or rod can be placed at any convenient location on the control mechanism. Its output signal is transmitted by a flexible connecting lead 91 to an electronic measuring apparatus 92 placed at any convenient location on the bicycle. If necessary, this apparatus can also receive the output signal from another sensor indicating the direction of eccentricity.

One advantageous aspect of such a measuring device is that the output signal of the force sensor, representing the evolution in the torque Mr illustrated in FIG. 9, also indicates the number of half revolutions of the chain wheel carrier, which is equal to the number of maximums of curve 75. As a result, measuring apparatus 92 can calculate the energy from this single signal. Using a clock signal, it can also calculate the mean power over a predetermined period and display this power and/or the energy to the user.

It is to be noted that a torque measuring device as described above can be applied not only to a crankset with a single crankshaft, thus to the type described in the present Application, but also to a crankset with two crankshafts, for example of the type described in International Patent Application Nos. WO 86/05459 and WO 97/20726. The crankset need only include an eccentric member carrying the output member formed by the chain wheel carrier which receives the driving forces from the cranks via articulated linkages.

Five other embodiments of a crankset with no dead center position according to the invention are illustrated in FIGS. 13 to 17, which are similar cross-sections to that of FIG. 3, but slightly enlarged. The differences with respect to the first embodiment described hereinbefore, will essentially be described, the reference numbers of said first embodiment being used again in the following Figures when they refer to the same elements, even if the latter have a slightly different configuration.

Figure 13:
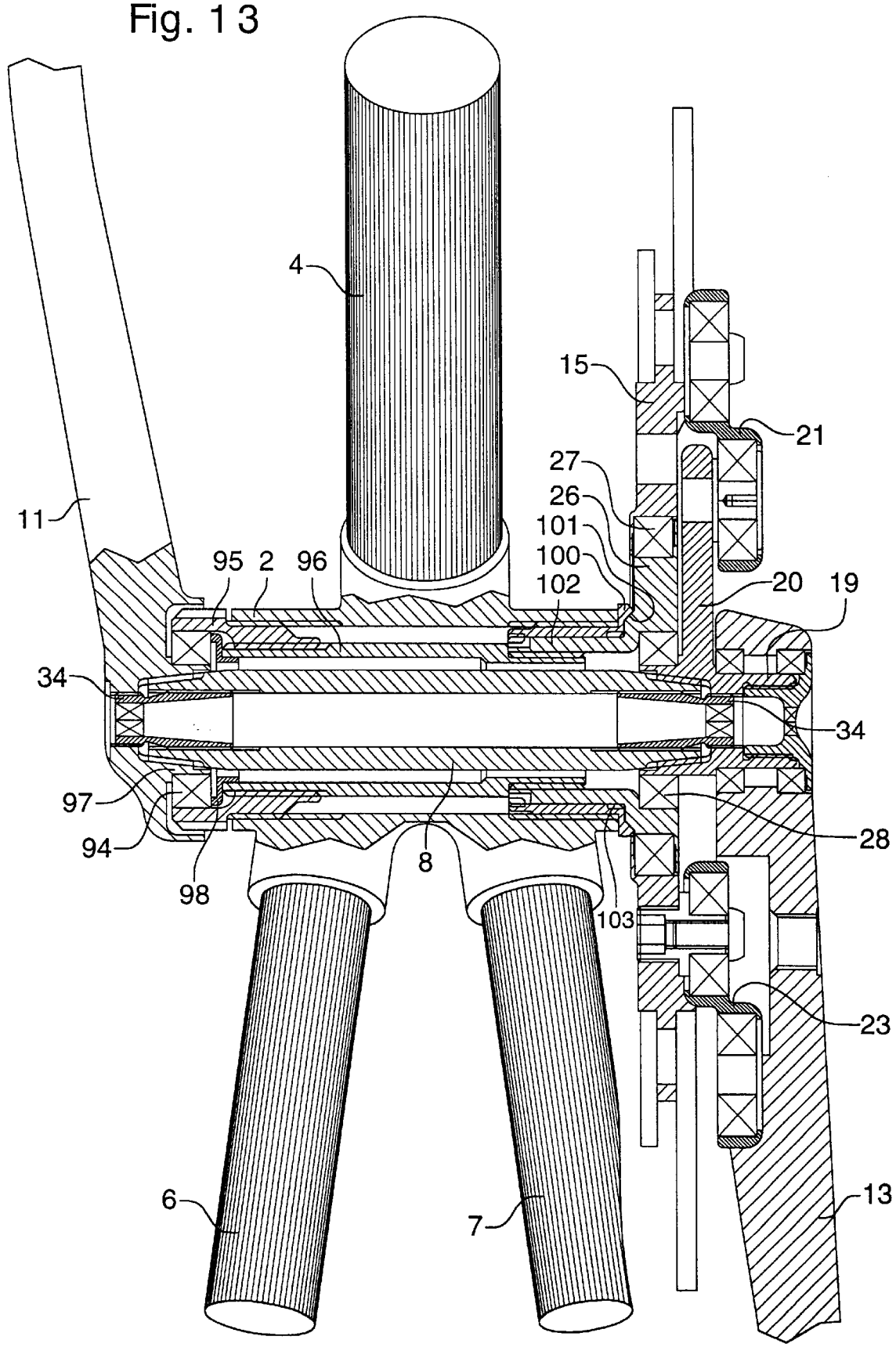

In the version of FIG. 13, crankshaft 18 bearing support hub 19 is mounted in crankset tube 2 indirectly, as a result of two roller bearings 94 and 28 which touch neither the crankshaft nor the tube. On the left side, a socket 95 threaded on the outside, is screwed into the end of tube 2 and has an inner threading into which is screwed a tubular spacer 96. The base of left crank 11 has an inner angular edge 97 which is fitted onto the conical end of crankshaft 8 and carries the inner ring of roller bearing 94. The outer ring of this roller bearing is pressed by an elastic washer 98 which abuts against spacer 96 and pre-stresses the roller bearing when threaded cap 34, which holds crank 11, is screwed into the crankshaft. The two threadings of this cap engaging respectively in crankshaft 8 and in crank 11 are of opposite directions, so that when the cap is screwed in, it is driven into the crankshaft and the crank is simultaneously moved nearer to the crankshaft, it engages in the grooves of the crankshaft and abuts against roller bearing 94. The same is true for the versions of the following FIGS. 14 to 17.

On the right side, tube 3 carries crankshaft 8 via eccentric member 26 and roller bearing 28, placed between the eccentric member and hub 19 as in the first embodiment. A socket 100 threaded on the outside is screwed into the right end of tube 2 and has a conical inner surface 101 which acts as centering surface for eccentric member 26, the latter having a corresponding centering surface as will be described hereinafter with reference to FIG. 18. Eccentric member 26 includes a cylindrical end portion 102 which fits with a slight radial play inside socket 100 and which has an inner threading for being screwed onto the right end of spacer 96. By screwing socket 95 onto spacer 96, eccentric member 26 is strongly applied against socket 100. Rotation of the eccentric member is blocked by grooves 103 on socket 100.

Hub 19 is secured to crankshaft 8 by means of threaded cap 34 and right crank 13 is secured to hub 19 in a similar manner to that described hereinbefore.

Figure 14:
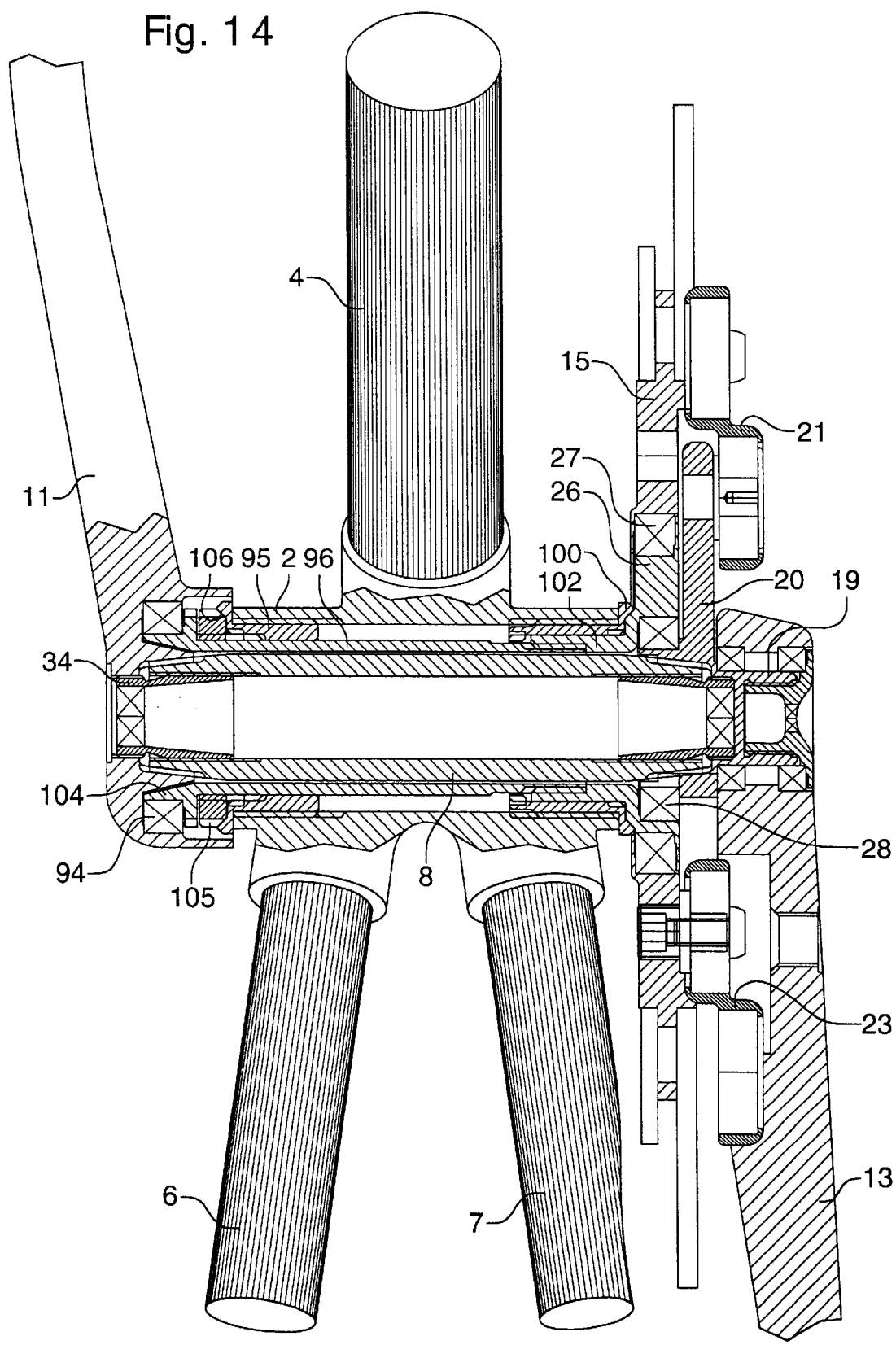

The version of FIG. 14 differs from that of FIG. 13 essentially as regards the arrangement of left roller bearing 94, whose outer ring carries left crank 11. The inner ring of this roller bearing is mounted on a shoulder of left end 104 of spacer 96. A nut 105 which, when tightened abuts against a conical centering surface 106 of threaded socket 95 screwed into tube 2, is screwed onto the spacer. At the same time, the tightening of nut 105 assures that eccentric member 26 abuts against socket 100, as in the preceding example.

In the version of FIG. 15, crankshaft 8 and hub 19 described hereinbefore are replaced by a single part including hollow crankshaft 108, support hub 119 formed by the right end of crankshaft 108, and lever 20 articulated to connecting rod 21. Tubular end portion 102 of eccentric member 26 is long enough to pass through the entire crankset tube 2, in place of spacer 96 described hereinbefore. Like the latter, it bears a nut 105 applied against a conical inner centering surface of threaded socket 95 screwed into the left end of tube 2. Eccentric member 26 is blocked in rotation on threaded socket 100 by means of a cylindrical pin 109 allowing the eccentric member to be oriented in different directions, as will be described hereinafter with reference to FIG. 18.

Crankshaft 108 is entirely supported by eccentric member 26 and its end portion 102, as a result of roller bearing 28 to the right and a left bearing formed of two rollers 110 which are pre-stressed between an inner shoulder of end portion 102 and a nut 111 screwed onto crankshaft 108, which also pre-stresses bearing 28. Left crank 11 is secured to the end of crankshaft 108 by a threaded cap 34 screwed in the crankshaft.

It will be noted that, simply by demounting the left crank and nut 105, this construction allows the entire crankset mechanism without a dead center position to be removed from tube 2, simply by sliding end portion 102 into sockets 95 and 100. This sliding is facilitated by the small radial play existing between end portion 102 and the two sockets, this play being achieved by the use of conical centering surfaces.

The version of FIG. 16 differs from that of FIG. 15 in that lever 20 is arranged on the exterior with respect to base 59 of right crank 13, and thus also with respect to roller bearings 62 and 63 carrying the crank on support hub 119 secured to crankshaft 108. Screwing nut 111 pre-stresses not only roller bearings 110 and 28 of crankshaft 108, but also roller bearings 62 and 63 which are compressed axially between the flared end of hub 119 and an intermediate ring 112 abutting against the inner ring of roller bearing 28. The remainder of crankshaft 108 is supported as in the preceding example, which offers the same advantages.

An advantage of the external arrangement of lever 20 is that connecting rods 21 and 23 can be rectilinear and their roller bearings are all substantially in the same plane, which reduces the non radial stress on these bearings. However, lever 20 is not cumbersome since it does not exceed the space occupied by crank 13 laterally (to the right in the drawing).

In the version of FIG. 17, lever 20 is arranged between the two roller bearings 62 and 63 carrying base 59 of crank 13. This is why it is formed by a separate part, having an annular base 120 which is fitted onto hub 119, to which it is secured by screws 121. Lever 20 extends through a slot 122 of base 59 of the crank, where it performs an angular oscillation substantially identical to that of left crank 11 with respect to right crank 13. This slot may be blocked in a manner which will be described hereinafter. Crank 13 is held axially and its roller bearings 62 and 63 are pre-stressed by a threaded cover 64 as described with reference to FIGS. 3 and 4.

Eccentric member 26 and its tubular end portion 102 are supported in tube 2 via threaded socket 100, as in the version of FIGS. 15 and 16, and they carry hub 119 of crankshaft 108 via roller bearing 28. Roller bearing 94 carrying the left end of crankshaft 108 is mounted directly in threaded socket 95 which is screwed into tube 2, whereas the right end of the socket is screwed onto end portion 102 to assure the tightening and centering of eccentric member 26. The base of left crank 11, secured to crankshaft 108 via threaded cap 34, carries an outer nut 124 which abuts against the inner ring of bearing 94 to pre-stress it as well as bearing 28.

It will be noted that the particular arrangement of lever 20 according to FIG. 17 allows a rectilinear configuration of connecting rods 21 and 23 as in the preceding example. It has the further advantage of spacing out the two roller bearings 62 and 63 on hub 119, which assures very rigid mounting of the crank and a reduction in the stress on the roller bearings.

FIG. 18 shows in more detail how eccentric member 26 and its end portion 102 are positioned in a centered manner in threaded socket 100 when they are pulled towards the left by threaded socket 95 shown in FIG. 13, or by nut 105 shown in FIGS. 14 to 16, or by nut 124 shown in FIG. 17. Socket 100 secured to the crankset tube has the inner conical surface 101 (FIG. 13) against which an outer conical surface 126 of end portion 102 will abut, these two surfaces thus constituting centering surfaces, since a radial play exists between elements 100 and 102.

In order to assure angular positioning of eccentric member 26 about central axis 10, a radial collar 127 of socket 100 includes at least one axial hole 128 intended to accommodate cylindrical pin 109. At the same distance from axis 10, eccentric member 26 includes a circular row of holes 129 each of which can be set opposite hole 128 and accommodate pin 109. This pin can still be accessed by rotating the cranks to a position where the pin is not covered by crank 13 or lever 20, so that the user can modify the direction of eccentricity at will by pivoting eccentric member 26 after having unscrewed the nut mentioned above and by placing the pin in another of holes 129.

A threaded bore 130 can also be seen in FIG. 18 for screws 131 (FIG. 17) allowing roller bearing 27 to be secured axially on the eccentric member.

FIGS. 19 to 21 show how, in the construction illustrated by FIG. 17, it is possible to block slot 122 of base 59 of right crank 13, through which lever 21 oscillates, in order to prevent dirt entering this slot. A cap 140 is provided for this purpose, preferably made of plastic material and fitted onto lever 20, on which it can be held by a snap-fitting arrangement or any other suitable means. In front of and behind the lever, cap 140 has a skirt 141 which is applied by sliding against base 59 of the crank. FIG. 21 shows the two end positions 20a and 20b which the lever reaches by oscillating in slot 122. It can be seen that each skirt 141 is long enough to block this slot in any position of the lever. On the other hand, FIG. 19 shows that the outer face 142 of cap 140 can advantageously be flush with the outer surface of over 64 covering roller bearing 63 of the crank, so that the crankset has no inconvenient projecting part in this area. FIG. 19 also shows a particular embodiment of cover 64, offering a smooth outer surface because its six-sided bore 144 is located on the inner side, in order to be accessible from the other end of the hollow crankshaft.

In a variant which is not shown, cap 140 could be replaced by a cap fixed to the outer face of cover 64 which performs the same oscillation movement as lever 20. This cap could cover slot 122 without necessarily covering lever 20. In another variant, it is possible to combine cap 140 and cover 64 in a single part, which can be fixed by a central screw inside hub 119.

The various embodiments described with reference to FIGS. 13 to 21 can of course be combined with each other as regards certain aspects. For example, the arrangement of lever 20 inside, in the middle or outside the two roller bearings 62 and 63 can be combined with any of the modes of mounting crankshaft 8 or 108 in crankset tube 2. The same is true as regards making the shaft and the support hub in two pieces 8 and 19 or in a single part 108, 119.

Further, it is also possible to combine the embodiments illustrated by FIGS. 13 to 21 with a device for measuring the reaction torque exerted on the eccentric member, according to the principles explained with reference to FIGS. 7 to 12. However, since the eccentric member is blocked in rotation by pin 109, measuring the stress which it undergoes, in particular because of the lateral offset of connecting rods 21 and 23 with respect to the median plane of chain wheel carrier 15 and eccentric member 26, could be achieved using strain gauges placed on the eccentric member.

What is claimed is:

1. A crankset with no dead center position, including:
    a fixed crankset tube,
    a crankshaft rotatably mounted about a central axis within said crankset tube,
    a first crank fixed to a first end of said crankshaft,
    a second crank having a base rotatably mounted relative to a second end of said crankshaft,
    an eccentric member arranged in proximity to said second end of said crankshaft and connected to said tube via stopping means,
    an output member mounted on said eccentric member so as to rotate about an eccentric axis which is parallel to said central axis, but offset in a direction of eccentricity, said output member being arranged to drive a mechanical transmission, and
    first and second articulated linkages which respectively connect said crankshaft and said second crank to said output member in order to drive the latter,
    wherein said second end of said crankshaft is provided with a support hub on which said eccentric member and said second crank are rotatably mounted by respective bearings, said support hub being provided with a lever which forms part of said first articulated linkage.

2. A crankset according to claim 1, wherein said support hub is made in a single part with said crankshaft.

3. A crankset according to claim 1, wherein said base of the second crank is pressed towards said crankshaft by means of a thrust bearing arranged between said base and a cover secured to said hub by screwing.

4. A crankset according to claim 1, wherein said stopping means are arranged to define different directions of eccentricity of said eccentric member.

5. A crankset according to claim 4, including, facing said eccentric member, a socket screwed into said tube and provided with notches distributed around its periphery on the outside of the tube, said stopping means including an indexing ring arranged to engage in said notches and provided with external grooves on which said eccentric member can be engaged in different angular positions.

6. A crankset according to claim 1, wherein said eccentric member includes a tubular end portion abutting said first end of said tube as a result of centering surfaces, said crankshaft being supported by said tube end via said eccentric member.

7. A crankset according to claim 6, wherein said centering surfaces include a conical outer surface on said end portion of said eccentric member and a conical inner surface on a threaded socket which is screwed into said second end of said tube.

8. A crankset according to claim 1, wherein said base of said second crank is mounted on said support hub by means of two roller bearings and wherein said lever is formed by a separate part fixed to said support hub between said two roller bearings and extending through a slot of said crank base.

9. A crankset according to claim 8, wherein said slot is blocked by a cap secured to said crankshaft or to said lever and provided with a skirt which covers said slot.

10. A crankset according to claim 1, including a device for measuring a reaction torque exerted on said eccentric member by said stopping means.

11. A crankset according to claim 10, wherein said stopping means are arranged to exert an orthogonal force of said eccentric member with respect to said central axis and wherein said torque measuring device includes a force sensor incorporated in said stopping means to measure said force.

12. A crankset according to claim 11, wherein said stopping means are arranged to define different directions of eccentricity of said eccentric member, said stopping means including a control mechanism, arranged to modify the direction of eccentricity, and said force sensor being incorporated in said control mechanism.

13. An assembly including a crankset according to claim 10 and an apparatus for measuring energy provided to the crankset by a user, said apparatus including said device for measuring the reaction torque exerted on said eccentric member by said stopping means.

14. An assembly according to claim 13, wherein said measuring apparatus includes means for calculating and displaying power on the basis of said measured energy.

15. A crankset according to claim 1, wherein said support hub is formed by a part distinct from said crankshaft and is fitted in a removable manner onto said second end of said crankshaft.

16. A crankset according to claim 15, wherein said second end of said crankshaft includes a conical portion used as a seating for said support hub, said hub being secured onto said crankshaft by means of a central member axially screwed into said crankshaft.

17. A crankset according to claim 16, wherein said second end of the crankshaft also includes a portion with a grooved or non-circular profile, which co-operates with a corresponding inner profile of said support hub.

18. A crankset according to claim 15, wherein said support hub and said lever are made in a single part.

19. An assembly including a crankset with no dead center position and an apparatus for measuring the energy provided to the crankset by a user, said crankset including:

a fixed crankset tube, at least one crankshaft rotatably mounted about a central axis inside said crankset tube, a first crank secured to a first end of said crankshaft, a second crank having a base arranged in proximity to a second end of said crankshaft and rotatably mounted with respect to said crankshaft, an eccentric member arranged in proximity to said second end of said crankshaft and linked to said tube by means of stopping means, an output member rotatably mounted on said eccentric member about an eccentric axis which is parallel to said central axis, but offset in a direction of eccentricity, said output member being arranged to drive a mechanical transmission, and a first and a second articulated linkage which link respectively said crankshaft and said second crank to said output member to drive the latter, said apparatus including a device for measuring a force exerted on said eccentric member and means for calculating, from said force, a reaction torque exerted on said eccentric member by said stopping means and calculating said energy by integrating said torque with respect to the rotation of said output member.

20. An assembly according to claim 19, wherein said measuring apparatus includes means for calculating and displaying power on the basis of said measured energy.

* * * * *